United States Patent [19]

Rossin et al.

[11] Patent Number: 5,767,859

[45] Date of Patent: Jun. 16, 1998

[54] METHOD AND APPARATUS FOR CLIPPING NON-PLANAR POLYGONS

[75] Inventors: Theodore G. Rossin; Alan S. Krech, Jr., both of Fort Collins, Colo.

[73] Assignee: Hewlett-Packard Company, Palo Alto, Calif.

[21] Appl. No.: 535,499

[22] Filed: Sep. 28, 1995

[51] Int. Cl.$^6$ .................................................. G06T 15/00
[52] U.S. Cl. ............................................................ 345/434
[58] Field of Search ....................................... 395/134, 123, 395/130

[56] References Cited

U.S. PATENT DOCUMENTS

| | | | |
|---|---|---|---|
| 4,646,251 | 2/1987 | Hayes et al. | 395/123 |
| 5,307,450 | 4/1994 | Grossman | 395/123 |

*Primary Examiner*—Almis R. Jankus
*Attorney, Agent, or Firm*—Edward L. Miller

[57] ABSTRACT

A hardware graphics accelerator accepts lists of polygon vertices from an application environment running application and systems graphics software. After a polygon is rotated and translated as needed, it is checked for trivial accept/reject against the clip limits of the viewing volume, but is not otherwise clipped. Polygons that are not rejected are decomposed into triangles before any other operations on them are performed. After decomposition the triangles are illuminated by light sources, if desired and then clipped by a triangle clipper, rasterized, and the results sent to a frame buffer for display. The triangle clipper incorporates trivial accept/reject operation, and is capable of operating on non-planar quadrilaterals. It avoids ugly artifacts during certain clip operations when the diagonal used to decompose a quadrilateral into triangles intersects a clip plane not parallel to the viewing axis. It does this by replacing the point of intersection along that diagonal that the clipper would ordinarily find with a point that is the projection of that diagonal onto a line between two adjacent points of intersection of the actual edges of the quadrilateral with the clip plane.

5 Claims, 8 Drawing Sheets

METHOD AND APPARATUS FOR CLIPPING NON-PLANAR POLYGONS

BACKGROUND OF THE INVENTION

A modern graphics system represents the surface of an object as a collection of polygons; in turn, each polygon is described by a list of vertices. In some systems the surface of interest might best be represented by polygons that are quadrilaterals. In any case, it is quite common that the vertices of any given polygon do not all lie in the same plane. The "real" shape of such a non-planar polygon is generally not a live issue; even assuming that the vertices are connected by straight lines, there are an infinite number of different shapes for the enclosed interior surface that are consistent with the given vertices. When actually drawing a polygon on an output device, interpolation techniques are used to select pixel locations that approximate a minimally curved surface for the enclosed interior of each polygon. The reason that the "real" shape of the polygon can be ignored in favor of the interpolated approximation is that the larger features of the object's shape are represented by progressive differences between the various collections of vertices for a large number of polygons (i.e., the polygons are small compared to the size of those features).

Clipping is an operation where a portion of an object is removed because that portion extends beyond a boundary. For example, a solid object may extend beyond a plane. In such a case the various polygons that describe the object need to be altered to remove vertices that lie beyond the clip boundary. This produces new vertices for such polygons; i.e., those vertices that are at the intersection of an edge with the clip boundary. For example, the clip boundary may be the surfaces of a "viewing volume" within which the object is located. The viewing volume could be a truncated pyramid, or something more rectangular, or even cubical. As the object is scaled in size or reoriented within the viewing volume, differing portions of the object may intersect with the clip boundaries.

In some systems the polygons are decomposed into constituent triangles prior to certain rendering operations, such as the selection by a graphics accelerator of pixel values (location, colors, depth, etc.) for pixels on or interior to the polygons. Dedicated hardware to clip and render triangles is simpler than that needed for quadrilaterals, and it runs faster, too. Unfortunately, the clipping of a non-planar polygon after it is decomposed into triangles can create some ugly artifacts in the resulting image. To appreciate how these artifacts can arise, consider how decomposing a quadrilateral into triangles "changes" the quadrilateral. Let the consecutive adjacent vertices of the quadrilateral be $v_1$, $v_2$, $v_3$ and $v_4$. Then there are two (different) ways that the quadrilateral can be divided into two triangles: along the diagonal $v_1$–$v_3$ and along the diagonal $v_2$–$v_4$. Note that whichever diagonal is selected declares "new" information about the original quadrilateral; i.e., that the selected diagonal lies on the surface of the quadrilateral. No such information accompanied the original description having only the four vertices $v_1$–$v_4$. So, when the two triangles are clipped, there will generally be included as part of the result a vertex point $v_d$ somewhere along the diagonal. However, if the original quadrilateral is clipped with a quadrilateral clipper: (1) There will be no such diagonal to force an intersection with a surface of the clipping volume, so $v_d$ does not become a vertex of the clipped quadrilateral; (2) The vertices that do arise from clipping are selected by the clipper according to its own rules, and they will always lie along legitimate edges of the quadrilateral; and (3) The point $v_d$ will generally not even be on an original edge of the clipped quadrilateral (which probably is not even a quadrilateral any more, either). It appears that (3) underlies why the display artifacts, mentioned above concerning clipping the decomposing triangles, are so ugly. If the point $v_d$ is not along an original edge it almost surely contributes a form of jagging to the clipped edge of the object. Unfortunately, however, quadrilateral clippers, especially those done in hardware, are expensive because of their internal complexity, while triangle clippers are comparatively simple. It would therefore be desirable if the more gracious performance of a quadrilateral clipper could be obtained through the operation of a simpler triangle clipper.

SUMMARY OF THE INVENTION

A solution to the problem of avoiding artifacts in non-planar quadrilaterals when using a triangle clipper in place of a quadrilateral clipper involves finding a projection (along a direction normal to the clip plane) of the implied diagonal onto a line that is between the intersections by two adjacent sides of the quadrilateral with the clip plane. This point is a vertex that lies on an edge that would be produced by a genuine quadrilateral clipper. By correctly including that found vertex in lists of vertices that are subsequently processed by the triangle clipper, the original non-planar quadrilateral can be decomposed into clipped triangles that do not incorporate an unsightly artifact.

DESCRIPTION OF A PREFERRED EMBODIMENT

Figure 1:
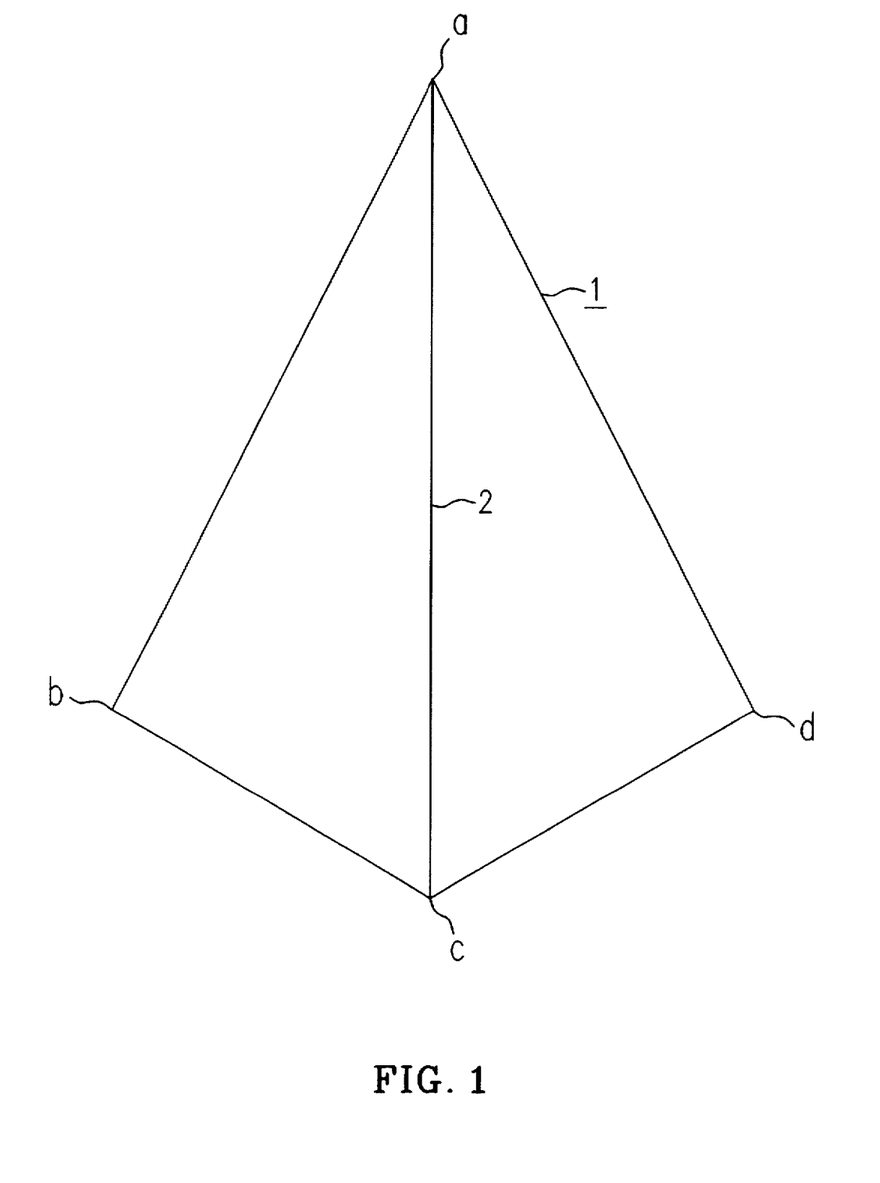
FIG. 1 is the view from above of an example non-planer quadrilateral having equal sides, folded along a diagonal into two identical triangles, sitting on a base plane surface normal to the viewing axis, and with the diagonal fold inclined 30° to the base plane.

Our discussion begins with FIG. 1, wherein is shown a view of a non-planar quadrilateral 1 that will produce an undesired artifact when clipped using a triangle clipper. Although it will be appreciated that the discussion that follows applies to all non-planar quadrilaterals, we have, without loss of generality, incorporated certain simplifying circumstances into the non-planar quadrilateral 1 of FIG. 1, the better to assist in visualizing the situation.

Assume that the viewing volume is rectangular, and that the viewing axis is perpendicular to, and intersects the center of, two of the sides of the viewing volume. Viewing is done from outside the viewing volume, so one of the sides is between the location of the viewer and the other side, and is called the clipping plane. The other plane may be called the base plane. For the sake of simplicity we further assume that the object to be viewed does not penetrate the base plane, so that we may concentrate on what happens when clipping the object against the clipping plane. Also, for our present purposes any clipping against the other four sides of the viewing volume is not of interest, although we admit that it may well occur. Those clips might even produce potentially ugly artifacts. However, those artifacts won't be visible, since, owing to the location of the point of view, those clips will appear simply to be a straight line (think "the clipping surface on edge"). Ugly artifacts will be invisible in clipping planes that are parallel to the viewing axis. Thus, it is with the hither clip against the clipping plane nearest the viewer that we are primarily interested. (Similar situations can arise with the yon clipping plane, but it is sufficient for our present purpose to show how to fix the problem in the hither clipping plane.)

Thus, in FIG. 1 we find a view "from above" of an example non-planer quadrilateral 1 having equal sides, folded along a diagonal 2 into two identical triangles, sitting on a base plane surface normal to the viewing axis, and with the diagonal fold inclined 30° to the base plane (not shown). By the phrase "from above" we mean simply that it is convenient to imagine that the base plane is parallel with and on, say a table top, and that the (hither) clip plane is above that, so that we are looking down on the quadrilateral 1.

The quadrilateral 1 has four vertices: a, b, c and d. The vertices a, b and d, as well as lines ab and da may be assumed to lie on the base plane of the viewing volume. Vertex c is somewhere between the viewer's location and the clip plane, so that lines bc and cd are inclined and appear shorter from the assumed viewpoint; their actual length in space, however, is the same as lines ab and da. This particular situation may be modeled by the reader through the simple task of creating a square piece of card stock, and folding it along a diagonal. The folded piece is then set on a table top such that three vertices are touching the table and the diagonal is inclined to the table at 30°. Then simply look down from above.

It will be appreciated that the example non-planar quadrilateral 1 of FIG. I is but one of a great many different particular shapes that might be used. (And note in particular, that the edge 2 only exists because of the contingent assumption of folding a planar square into two planar triangles with a common shared hypotenuse; in the general case that diagonal is not there. That is, we could specify the four vertices a–d only, and say nothing about any line ac.) Certainly the quadrilateral need not be a square, and the surface being approximated by the various quadrilaterals might well be curved. Nevertheless, the square quadrilateral 1 of FIG. 1 will serve admirably to illustrate what goes wrong when conventional clipping is used, as well as how to fix it.

Figure 2:
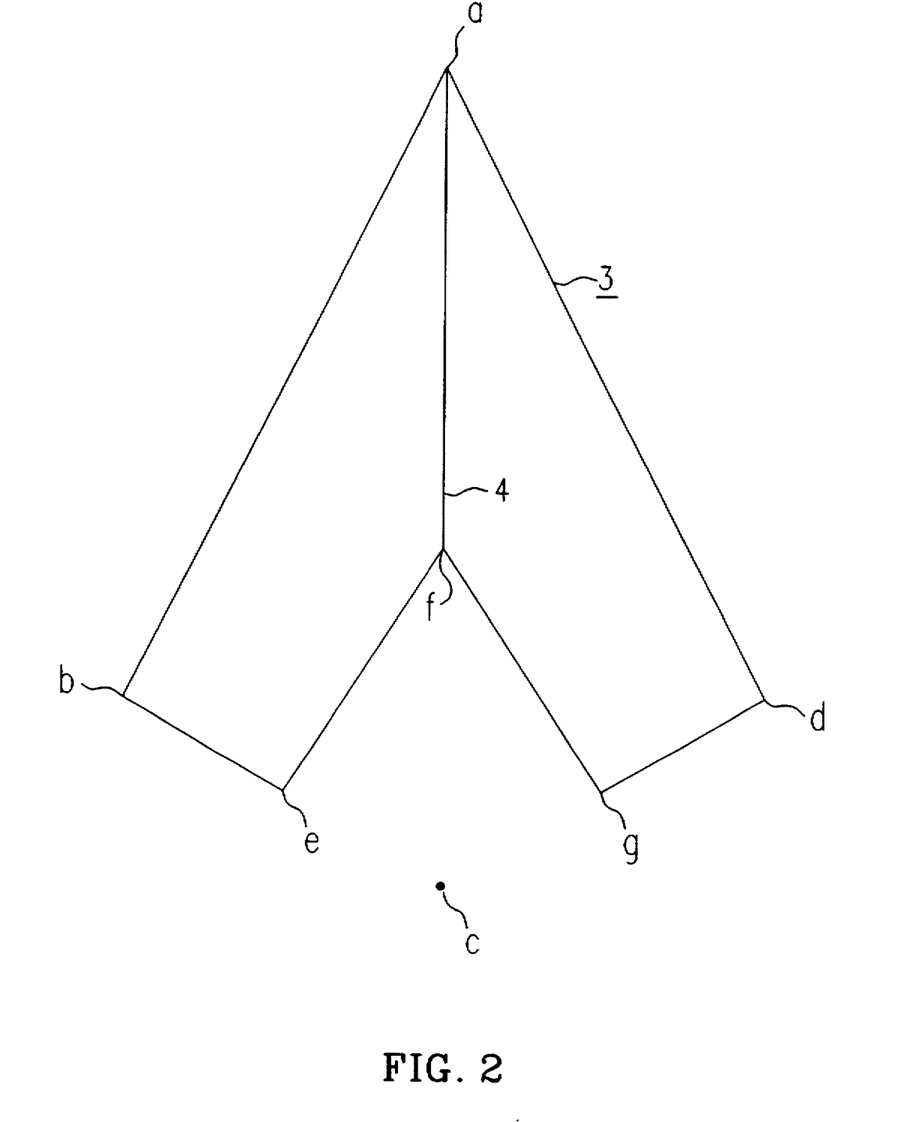
FIG. 2 is the view from above of the same quadrilateral as in FIG. 1, except that it has now been clipped against a plane parallel to the base plane and that intersects the diagonal at about 55% of its length, as measured beginning at the diagonal's intersection with the base plane, with the result that it includes an ugly artifact.

Refer now to FIG. 2, and assume that the clip plane intersects the diagonal 2 of FIG. 1 at the location of vertex f in FIG. 2. In the same fashion, line bc gains an additional vertex e, as does line cd, which gains vertex g. The result is a clipped quadrilateral that is now a six-sided polygon 3 whose consecutive adjacent vertices are a b e f g d a and whose remaining diagonal af is the edge 4. Now, note that the diagonal section 4 is forced to be a part of the surface approximation once the portions a b e f a and a f g d a are decomposed into triangles. This goes along with the appearance of the ugly artifact, which is the removal by clipping of region e f g c e.

At this point it is appropriate to digress briefly so that we may indicate the relationship between the simplifying assumptions we have used and the various possibilities that make up the true state of affairs. First, we should mention at least two ways that the quadrilateral 1 of FIG. 1 might be free of any problems at all: (1) It might not intersect the clip plane; and (2) Even if it does intersect, the mechanism that decomposes the quadrilateral into component triangles could have selected the diagonal between vertices b and d as the line of division, rather than the one between vertices a and c. For our purposes we may assume that, unless one of the choices is impossible (which can happen, too), the decomposition mechanism randomly selects which diagonal to use. It is easy to appreciate why case (1) is free of problems: the absence of clipping leaves things altogether undisturbed, as it were. Case (2) is not quite so easy, but is still relatively simple, as can be seen by reference to FIG. 3.

Figure 3:
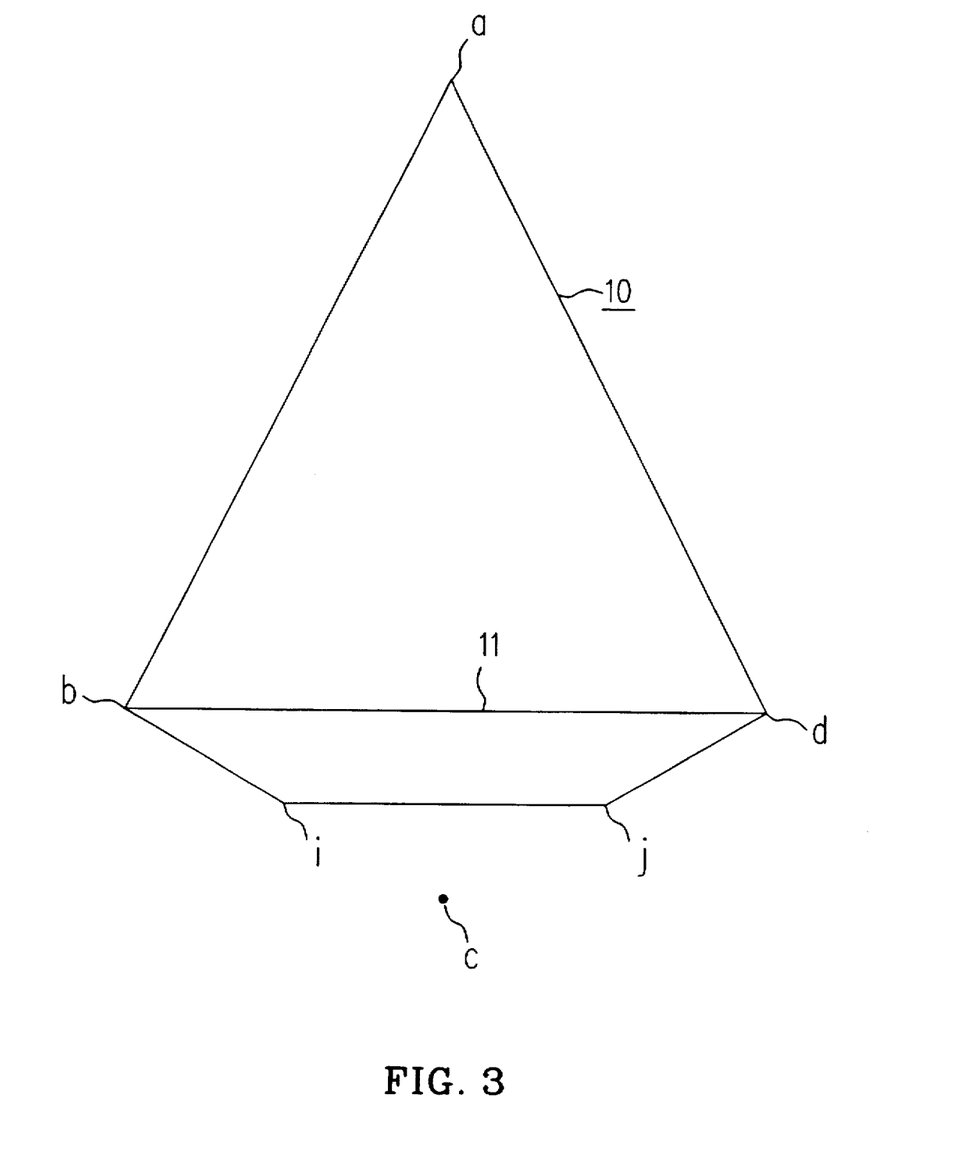
FIG. 3 is the view from above of a quadrilateral similar to that of FIG. 1 clipped against the same clip plane as in FIG. 2, but depicting a case where the ugly artifact does not arise owing to a difference in the way the quadrilateral was decomposed into triangles.

FIG. 3 depicts a quadrilateral 10 that started out the same as quadrilateral 1 of FIG. 1, except that, for whatever reason, it was decomposed into triangles using the diagonal bd 11 instead of the diagonal ac 2. The same hither clip plane is assumed to exist, and the line ij is where the triangle bcd intersects the clip plane. This case does not cause a problem; the line ij is exactly what one would expect. This agreeable result obtains because only one triangle (bcd) intersects the clip plane, producing just one line (ij). Compare this with the situation in FIG. 2, where, because the decomposition produces two triangles that each independently intersect the clip plane, two separate intersecting lines (ef and fg) are produced.

Figure 4:
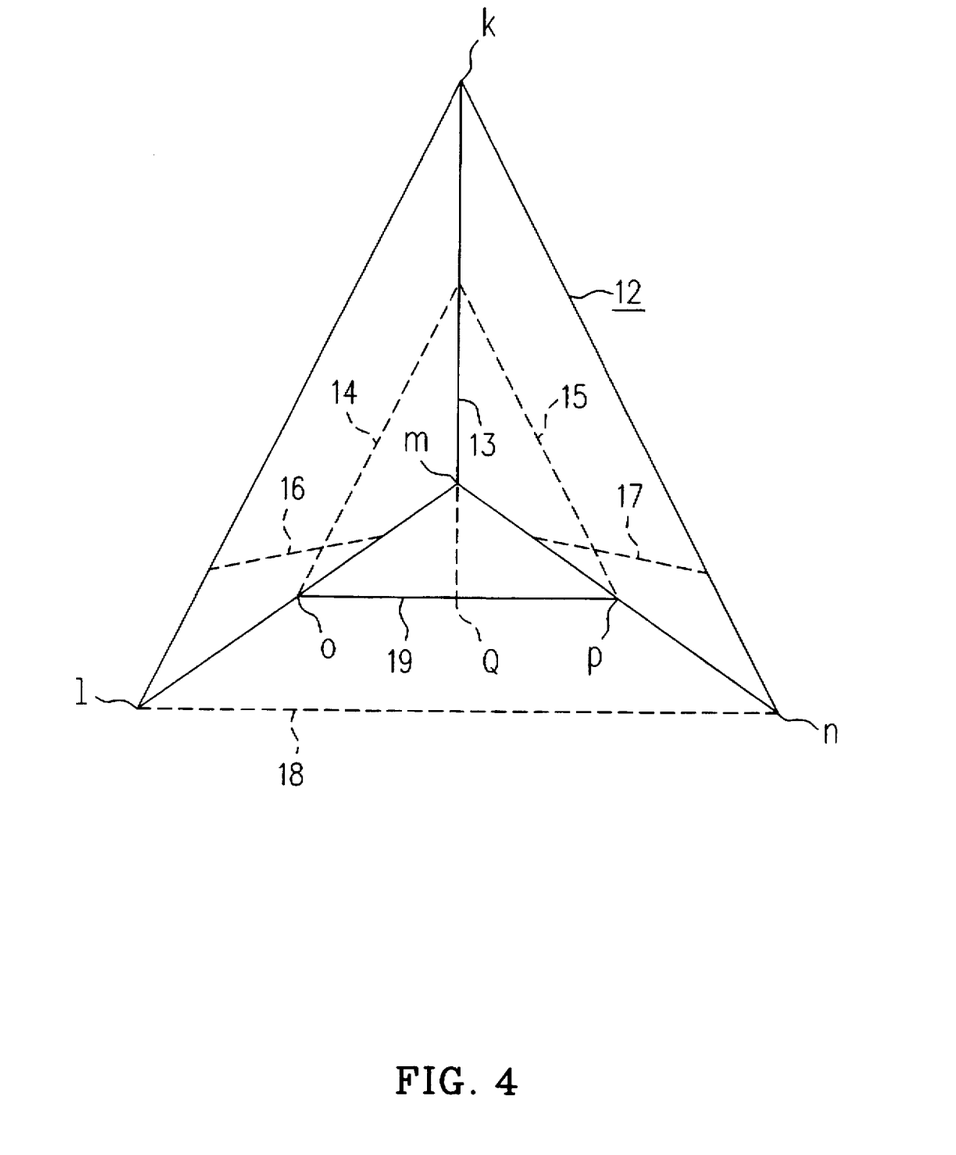
FIG. 4 is a view from above of an example concave non-planar quadrilateral decomposed into triangles that intersect various example clipping planes, one of which produces an ugly artifact.

While this may seem to suggest that the ugly artifact problem could be avoided by a smarter diagonal selection mechanism, such a conclusion is unsupportable in light of the example shown in FIG. 4. The quadrilateral 12 therein is convex, and only diagonal km 13 decomposes the overall quadrilateral into triangles. The "other diagonal" (line in 18) does not intersect the body of the quadrilateral at all. Now assume that the diagonal km 13 is inclined to a hither clip plane, just as in FIGS. 1 and 2 (simply let vertex c in FIG. 1 move along the line ac until it approaches vertex a). Dotted lines 14 and 15 (in FIG. 4) correspond to lines ef and fg (in FIG. 2) formed by intersection with a clip plane assumed to be in a location somewhat closer to the base plane than in FIG. 1, and would be produced by a triangle clipper applied after dividing the original quadrilateral into triangles. Clearly, clipping along lines 14 and 15 is just as loathsome as the situation in FIG. 2, but it can't be avoided by simply choosing the other diagonal (there isn't one). Note that a quadrilateral clipper would produce line 19 in place of lines 14 and 15, since line 13 is not assumed by a quad clipper to be an edge along the quad, and there cannot be a vertex except where there is an edge.

Now, momentarily consider allowing the vertices k l m and n to be arbitrarily placed, rather than placed as stated for FIG. 1. Let the intersection with some clip plane produce lines 16 and 17, and use a triangle clipper after division of the quadrilateral into triangles. Lines 16 and 17 are not ugly clips because each is simply the straight line between two adjacent points of intersection that both lie upon "actual" edges of the original quadrilateral. Even if the hither clip plane were moved toward the base plane until lines 16 and 17 intersected at vertex m, such lines 16 and 17 would remain legitimate and acceptable clip results that are exactly those that would be obtained from a quadrilateral clipper.

At this point it is interesting to note that FIG. 4 gives some insight as to why a genuine quadrilateral clipper is so complex. Suppose the original quadrilateral is positioned such that only the two small triangles at the tips (one with vertex 1 and line 16 and the other with vertex n and line 17) are what remain after clipping. Now a quadrilateral clipper has to be prepared to produce those two output primitives from a single input quadrilateral, whereas this never happens if the input is limited to triangles. This is a powerful reason for preferring triangle clippers to quadrilateral clippers, but there remains the difficulty of avoiding ugly artifacts when using the scheme of dividing into triangles and then clipping with a triangle clipper. What to do?

An examination of the situations depicted in FIGS. 2, 3 and 4 helps us to understand the bounds of the problem. The fact that diagonal 2/4/13 might be created by decomposing the original quadrilateral into two triangles is of interest only in that case where the diagonal properly intersects the clip plane (i.e., penetrates it, and does not merely touch it). When that situation occurs we shall say that we have an "evil quad" on our hands. Since it is only then that an ugly artifact will be created, our interest is confined to the case where there is an intersection between the clip plane and the diagonal created by decomposing the quad into triangles.

Before continuing the discussion, those readers unfamiliar with the notion of "clip codes" and with the Sutherland and Hodgman reentrant clipping algorithm may find it useful to refer to the discussion of "trivial accept" and "trivial reject" in §4.2.1 in the book *Fundamentals of Interactive Computer Graphics* by J. D. Foley and A. Van Dam (Addison-Wesley, ISBN 0-201-14468-9) and the article Reentrant Polygon Clipping in vol. 17 #1 of *Communications of the ACM* (January 1974, pages 32–42).

Figure 5:
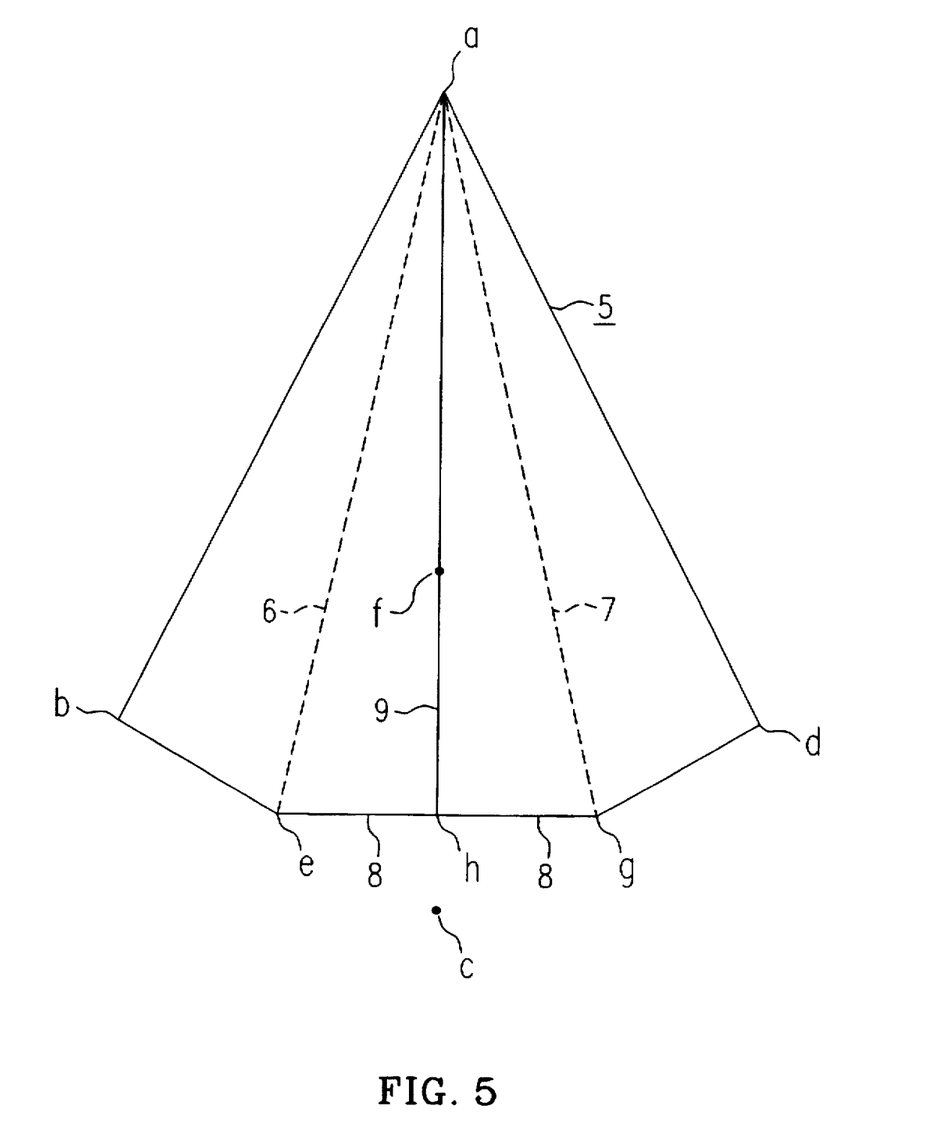
FIG. 5 is the view from above of the same quadrilateral as in FIG. 1 clipped against the clip plane of FIG. 2, but in accordance with the principles of the invention so as to avoid the ugly artifact.

Now refer to FIG. 5, wherein is depicted a way to clip the quadrilateral 1 of FIG. 1 without creating the ugly artifact of FIG. 2. In FIG. 5 the ugly cut-out portion e f g c e produced by clipping along lines ef and fg is replaced by clipping along line eg. That, however, is how one would describe what a quadrilateral clipper would do (and that is what it would do, too). To get the equivalent result from triangle clipping it is necessary to find the point h. This is done by finding the projection of the diagonal ac 9 onto the line eg 8. Vertex e is known from the intersection of original edge bc with the clipping plane, and vertex g is known from the intersection of original edge cd with the clipping plane. Once vertex h is found from projecting ac onto eg, the following process can commence.

A triangle clipper is given a vertex list, say, a b c. The list could start with any of those vertices, or it could be d a c for the comparable operation on the other triangle resulting from the decomposition. The triangle clipper would proceed in the given example by determining that line ab does not intersect the clipping plane. The term "clipping plane" as used here refers to any one of the six planes that define the viewing volume. To begin with, let it refer to the one that is not parallel to the viewing axis and that is closest to the eye of the observer. In this example a clip code associated with vertex a indicates that it is accepted, so vertex a goes into the output list; the absence of an intersection of line ab with the clipping plane puts vertex b into the output list. The clip codes associated with vertices b and c indicate that line bc intersects the clipping plane, and an appropriate computation produces vertex e, which is then placed into the output list. This is actually a second finding of vertex e; it is believed that allowing a regular triangle clipper to find it a second time saves hardware over an attempt to re-use the previously found values for e. Next, the triangle clipper examines the line ca. Ordinarily it would produce an intersection at vertex f. However, an additional mechanism within the triangle clipper detects that line ca is the diagonal used to divide the original quadrilateral into two triangles. On that basis the triangle clipper declines finding the intersection f and simply substitutes the already known vertex h, which is then put into the output list. At this point the triangle abc has been processed to produce the polygon ebeh. Now the polygon ebeh is re-examined using the same rules, but with a different plane of the viewing volume used as the clipping plane. The next step is to repeat the overall process just described with a list of vertices including a c and d, which does the other triangle that resulted from the initial decomposition.

Assuming there is no further clipping, the resulting polygons ebeh and ahgd are subsequently decomposed with diagonal ae 6 for polygon ebeh and with diagonal ag 7 for polygon ahgd. The result is triangles abe and aeh in place of polygon ebeh and triangles ahg and agd in place of polygon ahgd. These four triangles are then taken as the final primitives to be rasterized and written to the frame buffer for display.

The task of finding the vertex h by projecting line ca onto line eg which we may term "intersection-by-projection") may be accomplished by treating the problem as being strictly an intersection of two lines in an XY plane simply by suppressing the z coordinates. Ordinary line intersection techniques may be used to find either one of x or y in the (x, y) coordinates for h. Once one of those is found the remaining other one, and the associated z also, may be found by interpolation techniques. Interpolative techniques may also be used to determine other parameters associated with h, such as its color, texture, etc.

Figure 6:
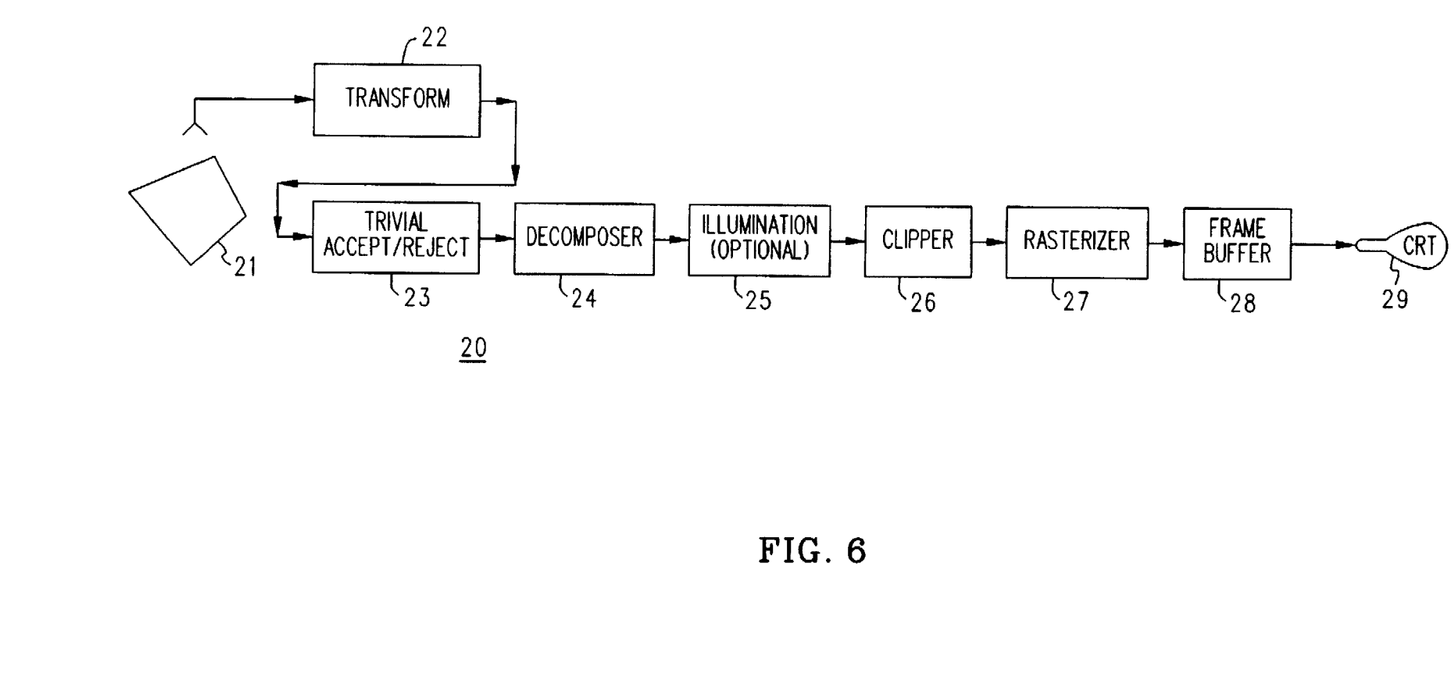
FIG. 6 is a simplified functional hardware block diagram of a graphics accelerator constructed in accordance with the improvements described herein.

Refer now to FIG. 6, wherein is shown a simplified hardware block diagram of a preferred embodiment 20 for a graphics accelerator that clips non-planar polygons in accordance with the above description. As depicted in FIG. 6, a polygon 21 (also represented as an ordered list of input vertices in registers or memory) is applied to a transform mechanism 22. This rotates and translates the polygon as needed to properly locate it within the viewing volume. Following that, the transformed polygon is inspected by a trivial accept/reject circuit 23. The transformed and checked polygon is then applied to a decomposer 24, which replaces the polygon with triangles. Next, an optional illumination mechanism 25 creates color and intensity values for the triangles of the polygon according to whatever light sources are assumed to be in use. After that the triangles of the polygon are clipped by a clipper 26 (if they were not trivially accepted) and the results applied to a rasterizer 27. The rasterizer finds locations and values for all the pixels that are interior to or lie upon the triangles representing polygon. These pixel values are then stored in a frame buffer 28, subsequent to which the triangles of the polygon will appear as images upon a CRT 29.

Those skilled in the art will appreciate that FIG. 6 represents data flow through a rather complex collection interacting mechanisms, just as much, or perhaps even more so, than it does a true "hardware block diagram". The hardware at issue includes many collections of registers interconnected by various busses and controlled by a whole nest of state machines. So, for example, even though the trivial accept/reject circuit (a job for a clipper) and the clipper 26 are shown as separate things, they are more properly understood as separate applications of a more or less common resource.

Figure 7:
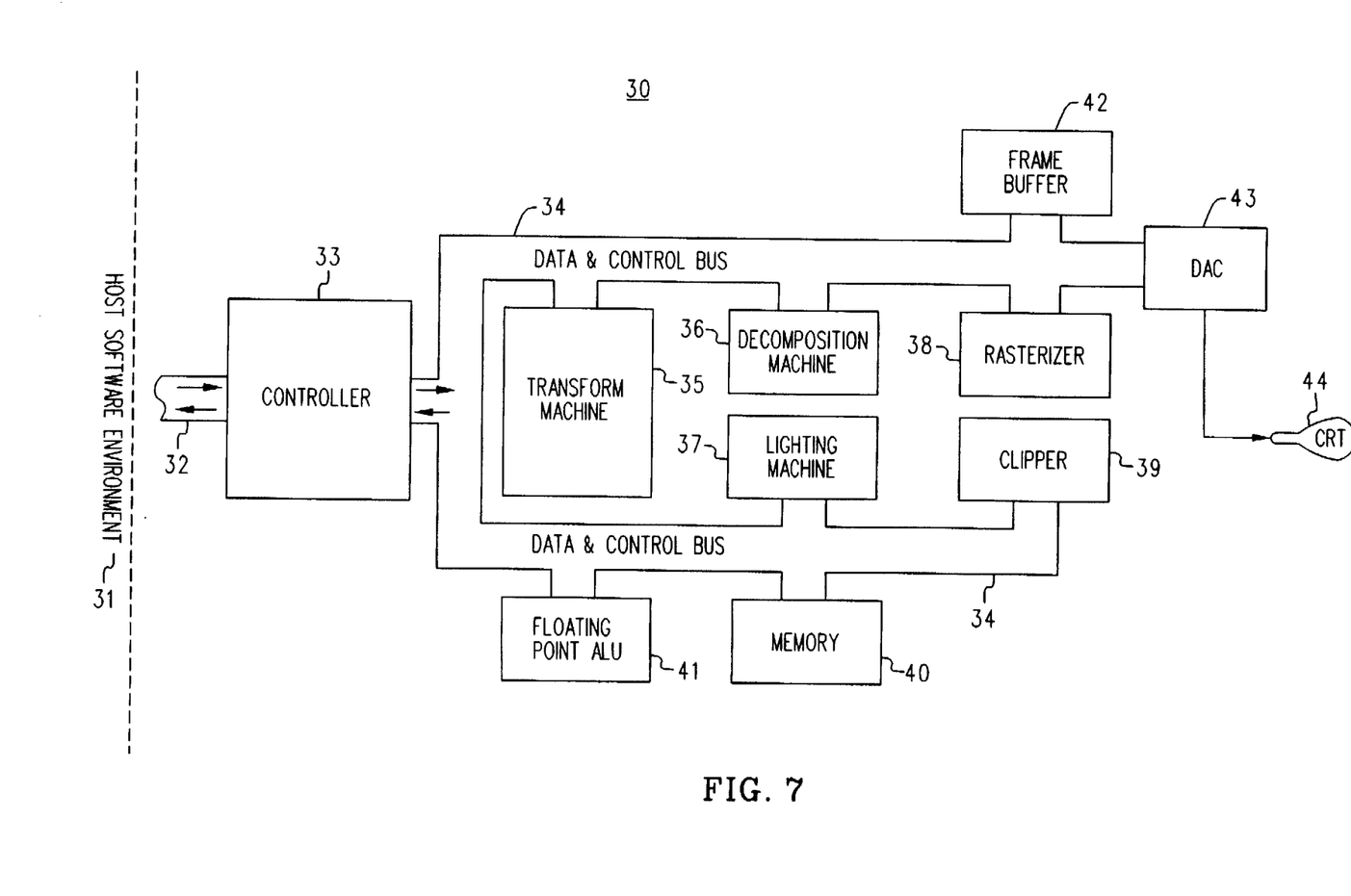
FIG. 7 a is simplified structural hardware block diagram of the graphics accelerator of FIG. 6.

FIG. 7 is a more accurate, yet still simplified, depiction of the hardware of a graphics accelerator 30 suitable for use in implementing the block diagram of FIG. 6. A host software environment 31 provides application level and initial system level graphics activity. A bus 32 conveys data and instructions to a controller 33 located within the graphics accelerator 30. This traffic consists principally of collections of ordered lists of input vertices describing collections of quadrilaterals representing an object to be displayed. The controller 33 includes one or more state machines (not shown) and appropriate collections of registers (not shown, either). The controller 33 initiates traffic on a data and control bus 34 that is in turn connected to each of the following mechanisms: transform engine 35; decomposition machine 36; lighting machine 37; rasterizer 38; clipper 39; memory 40; floating point ALU 41; frame buffer 42; and DAC 43 which is further connected to CRT 44. The controller manages the exchange of data among these resources and issues instructions to each as new polygons (in this case, quadrilaterals) are presented to the graphics accelerator 30 from the host software environment 31. Most of the named resources 35–39 include their own state machines and register collections.

Figure 8:
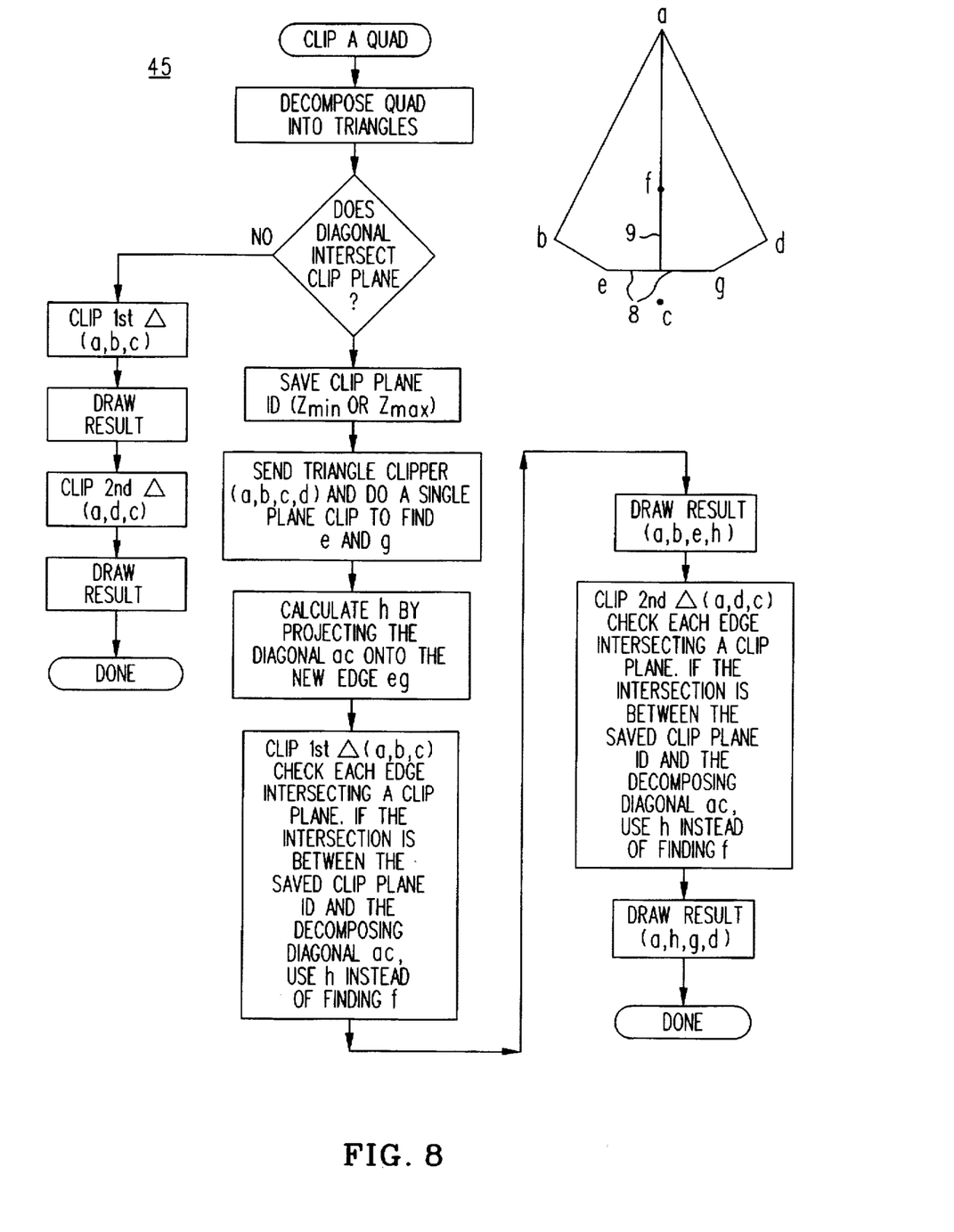
FIG. 8 is a flow chart illustrating the internal operation accomplished by a state machine within a clipper in FIG. 7.

FIG. 8 is a flow chart 45 that describes the internal operation of the clipper 39 of FIG. 7. The flow chart 45 is implemented by a large state machine, and is of necessity somewhat simplified. As it corresponds fairly closely to the explanation given in connection with FIG. 5, it is believed to be in need of no further explanation.

It is possible to extend the techniques described above to non-planar polygons having more than four edges. In the case of convex polygons it is sufficient to pick one vertex and create a fan of decomposing triangles. Each pair of adjacent triangles is then treated as described above, with their common edge playing the role of the "diagonal" in the above explanation.

We claim:

1. A method of clipping a non-planar polygon with a clipper that obeys rules for clipping triangles, the method comprising the steps of:

(a) selecting a clip plane;

(b) traversing the edges of the non-planar polygon and finding any points of intersection between the edges of the non-planar polygon and the selected clip plane;

(c) decomposing the non-planar polygon into a plurality of adjoining triangles, each of which share with another as a common edge a diagonal of the non-planar polygon;

(d) selecting a triangle to clip;

(e) finding, if it exists, the intersection of a projection of the diagonal associated with the selected triangle with a line segment between two adjacent points found in step (b); and (f) clipping the selected triangle with a clipper obeying rules for clipping triangles, except that if there is an intersection between the diagonal associated with the selected triangle and the selected clip plane, then the intersection found in step (e) is used in place of that aforesaid intersection within an output list of vertices produced by the clipper.

2. A method as in claim 1 wherein the non-planar polygon is a quadrilateral.

3. A method as in claim 1 wherein the non-planar polygon is a convex polygon having at least five edges.

4. Apparatus for clipping a non-planar quadrilateral described by an original list of vertices stored in a memory, the apparatus comprising:

first circuitry, coupled to operate on the original list of vertices, that finds intersections between a clip plane and edges of the non-planar quadrilateral;

second circuitry that decomposes the non-planar quadrilateral into triangles separated by a diagonal and described by respective first and second lists of vertices;

third circuitry, coupled to the first and second circuitry, that finds an intersection-by-projection of the diagonal and a line between the intersections found by the first circuitry; and a triangle clipper, coupled to the first and second lists of vertices and to the intersection-by-projection, that clips in accordance with rules for a triangle clipper except that it substitutes the point found by intersection-by-projection for any point of intersection between the diagonal and the clipping plane.

5. Apparatus as in claim 4 wherein the first, second and third circuitry and the triangle clipper comprise at least one state machine, an associated collection of registers and fourth circuitry that performs arithmetic computation.

* * * * *